(No Model.)   2 Sheets—Sheet 1.

G. D. BASSE.
APPARATUS FOR PRESERVING AND DISPLAYING VEGETABLES, &c.

No. 325,310.   Patented Sept. 1, 1885.

(No Model.) 2 Sheets—Sheet 2.
G. D. BASSE.
APPARATUS FOR PRESERVING AND DISPLAYING VEGETABLES, &c.
No. 325,310. Patented Sept. 1, 1885.
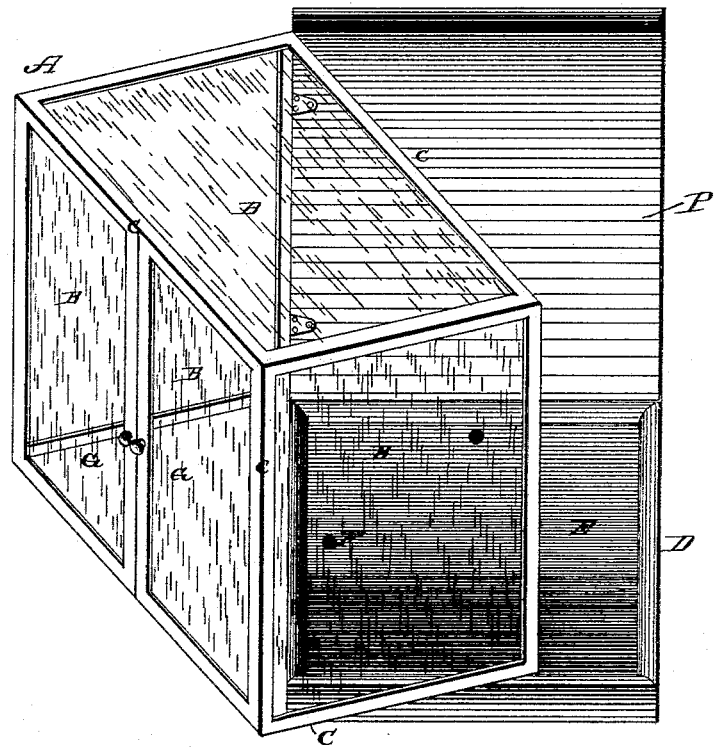
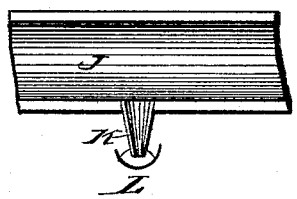

United States Patent Office.

GERHARD D. BASSE, OF MILWAUKEE, WISCONSIN.

APPARATUS FOR PRESERVING AND DISPLAYING VEGETABLES, &c.

SPECIFICATION forming part of Letters Patent No. 325,310, dated September 1, 1885.

Application filed May 5, 1884. (No model.)

*To all whom it may concern:*

Be it known that I, GERHARD D. BASSE, a citizen of the United States, residing at Milwaukee, in the county of Milwaukee and State of Wisconsin, have invented certain new and useful Improvements in Apparatus for Preserving and Displaying Vegetables, &c.; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of my invention is to provide an apparatus for preserving and displaying fruits, flowers, vegetables, and other garden products, and by which they are kept in as fresh and luxurious a condition as when growing in their natural element.

My invention is further explained by reference to the accompanying drawings, in which—

Figure 1:
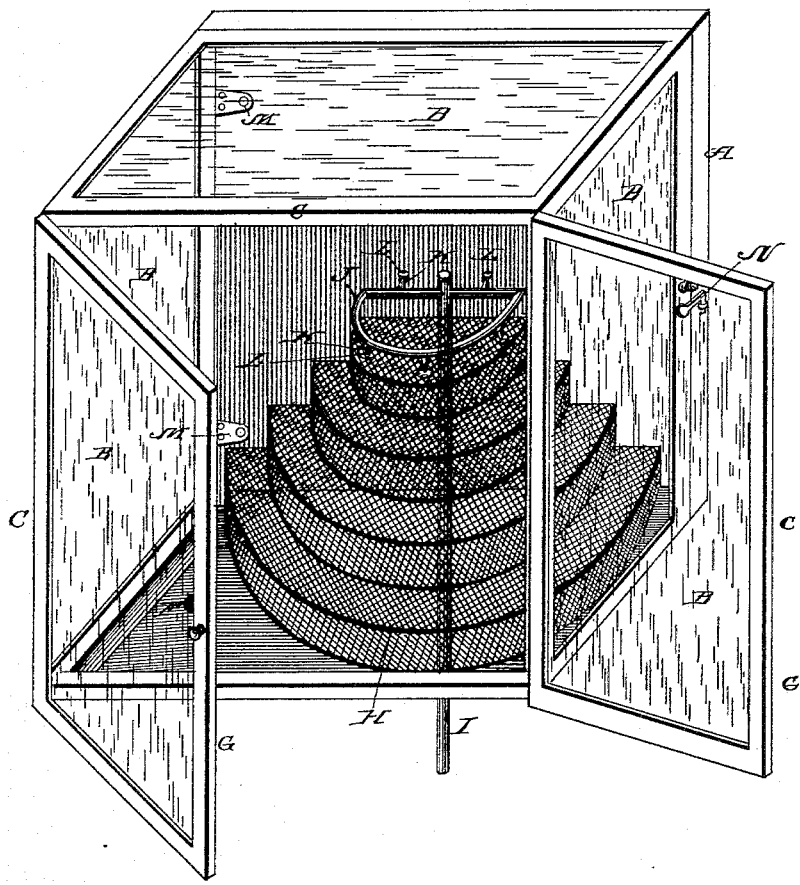
Figure 2:
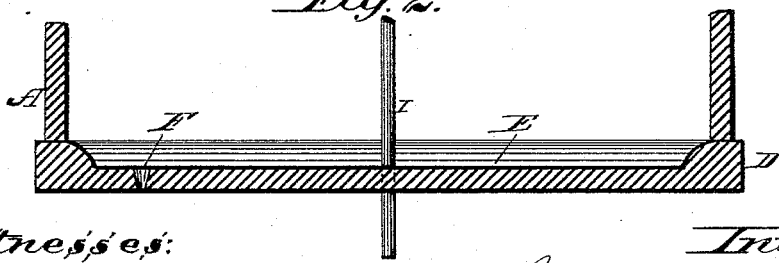

Figure 1 is a perspective view thereof. Fig. 2 is a vertical section of the base. Fig. 3 is also a perspective with the display-stand removed, showing the manner of removing the inclosure from the back and base; and Fig. 4 is a detail.

Like parts are represented by the same reference-letters throughout the several views.

A is the inclosing-case, which, when display is desired, is preferably made of plates of glass B, set in wood or metallic frame C. When, however, it is not desirous to display the contents, the sides and top may be made of wood.

D is the base, upon the edge of which the inclosure A rests. The upper surface of the base is slightly concave in shape, and is preferably lined with sheet metal, thus forming a basin, E, into which the vapor as it condenses descends, and from which it escapes through an aperture, F. The inclosure is also provided with one or more doors, G, which are also preferably formed of plates of glass B, set in frames C.

H is a display-stand, upon which the vegetables, fruits, and flowers are arranged in corners one above another, and around which they may be so interspersed with each other as to present a beautiful and attractive appearance.

I is a water-pipe leading from a stand-pipe or water-reservoir of such height as to give the water therein a high pressure, such as is usual for city water-works.

J is a distributing-tube, which is provided with one or more small holes or nozzles, K, through which the water is discharged with great force from the distributing-pipe.

L are small impact-plates or so-called "atomizers," against which the stream is directed, and by which it is broken into atoms and converted into a fine spray or vapor of such buoyancy as to float like a mist or cloud upon the atmosphere, whereby it is obvious that the entire atmosphere contained in the inclosure is thoroughly saturated with moisture, which moisture is in turn conveyed by the atmosphere upon the entire contents of the receptacle, thus keeping such contents fresh and wholesome, and preventing the leaves and flowers from wilting and the fruits and vegetables from withering or drying away, while the construction of the display-stand is such that through the glass inclosure the contents present an attractive appearance, which enhances their value and promotes their sale.

The inclosure A and back may be permanently attached together, if desired. I, however, prefer to attach them together temporarily by hinges M M at one corner only, as shown in Fig. 3, while the back P is permanently attached to the base D. When the inclosure is thus attached to the back by hinges, it may be swung away from the platform and back, as shown in Fig. 3, whereby the stand may be more conveniently set in place or removed with or without its contents from the case. When the case is closed in position against the back P, it is thus secured with the hook N or by a lock, as occasion may require.

The stand being in place and the vegetables, flowers, or other garden products being arranged, the case is closed and water is admitted to the pipe I, when it escapes, as mentioned, in a fine stream through holes or nozzles and in contact with the obstruction L, whereby it is converted into a fine spray, thereby preserving the contents of the inclosure in a fresh and wholesome condition.

Having thus described my invention, what I claim as new, and desire to secure by Letters Patent, is—

1. In an apparatus for preserving and displaying vegetables, fruits, &c., the combination of the inclosure A, base D, having basin E, show-stand H, water-pipe I, distributing-tube J, and one or more holes or nozzles, K, provided with an impact or atomizing plates, L, said pipes, nozzles, and atomizing-plates being adapted to convert the water into vapor within said inclosure and retain it in contact with the contents of the receptacle, as set forth.

2. In an apparatus for preserving and displaying garden products, the combination of the inclosure consisting of frames C, plate-glass sides B, base D, having basin E, rigidly-fixed back P, connected to said case A by hinges M M, water-pipe I, distributing-tube J, nozzles K, and atomizing-plate L, all substantially as and for the purpose specified.

In testimony whereof I affix my signature in presence of two witnesses.

GERHARD D. BASSE.

Witnesses:
JAS. B. ERWIN,
C. T. BENEDICT.